Figure 1:
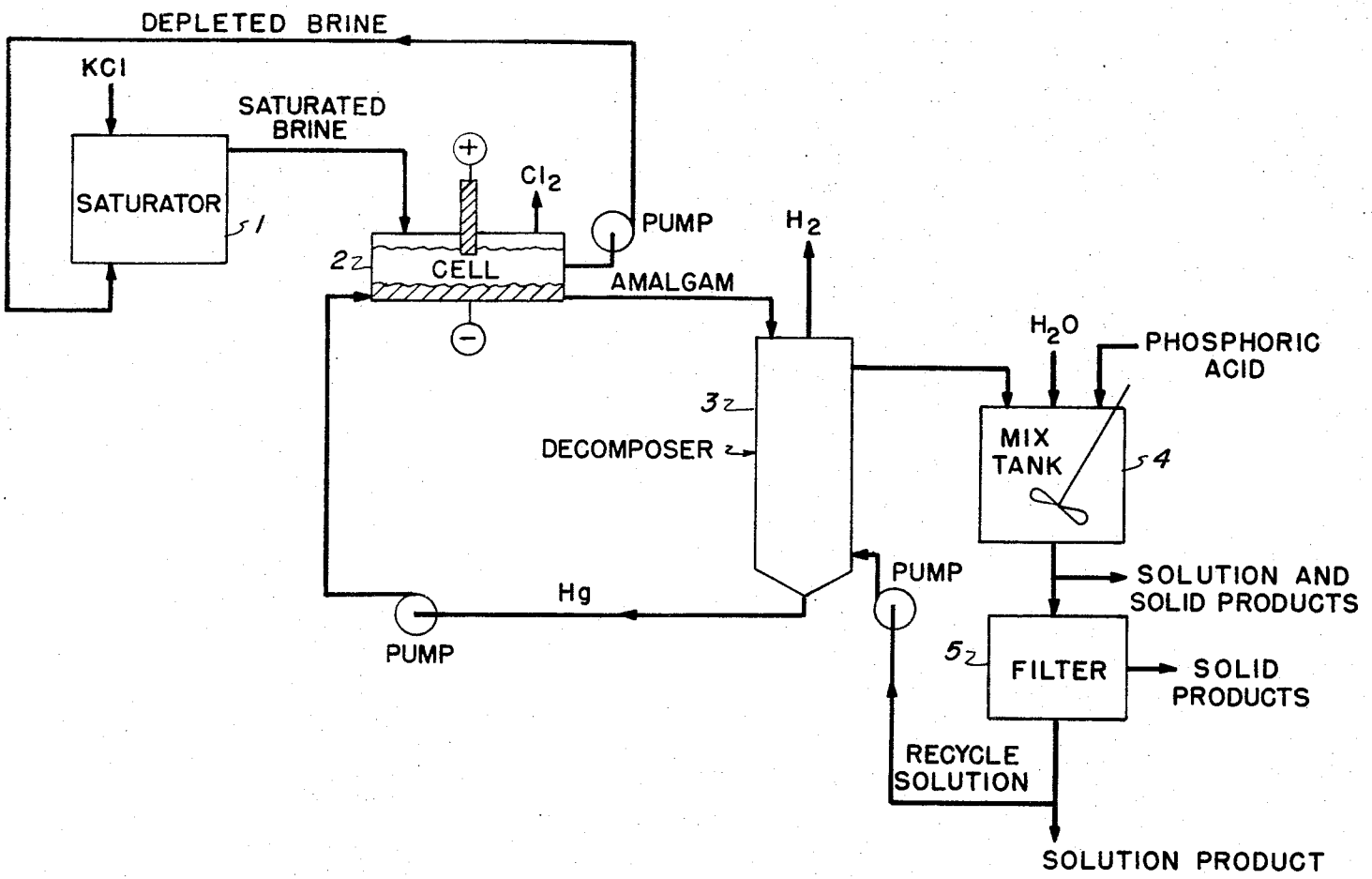
Figure 2:
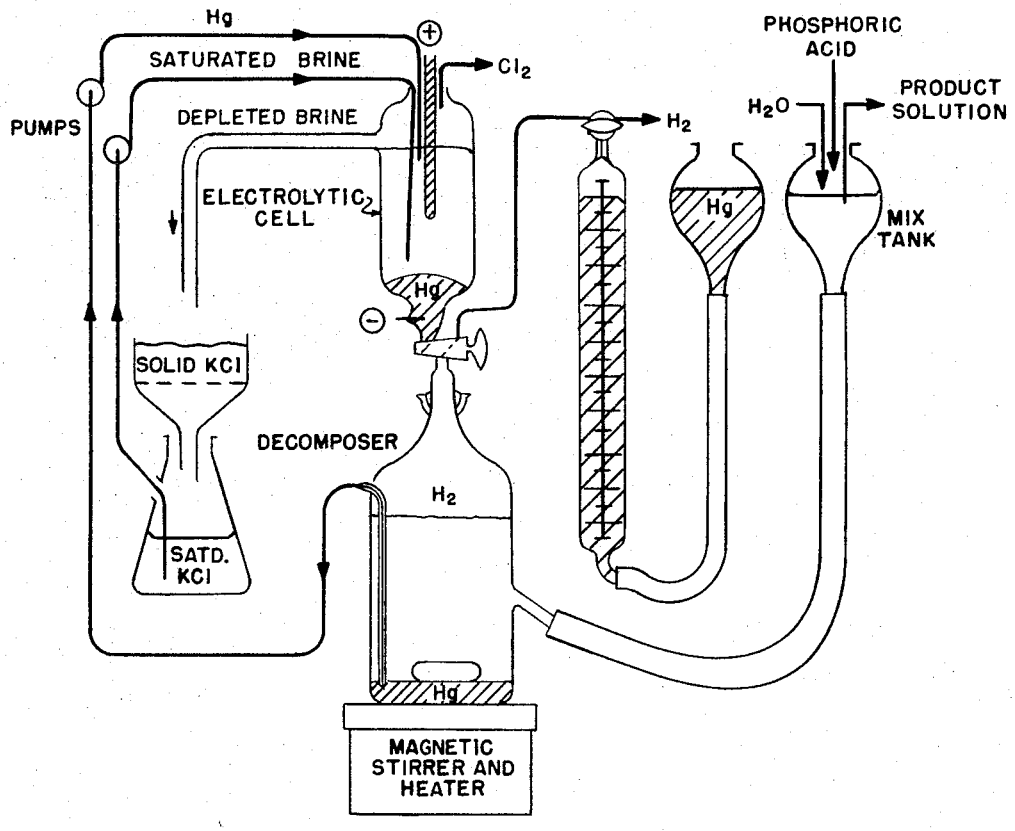
Figure 3:
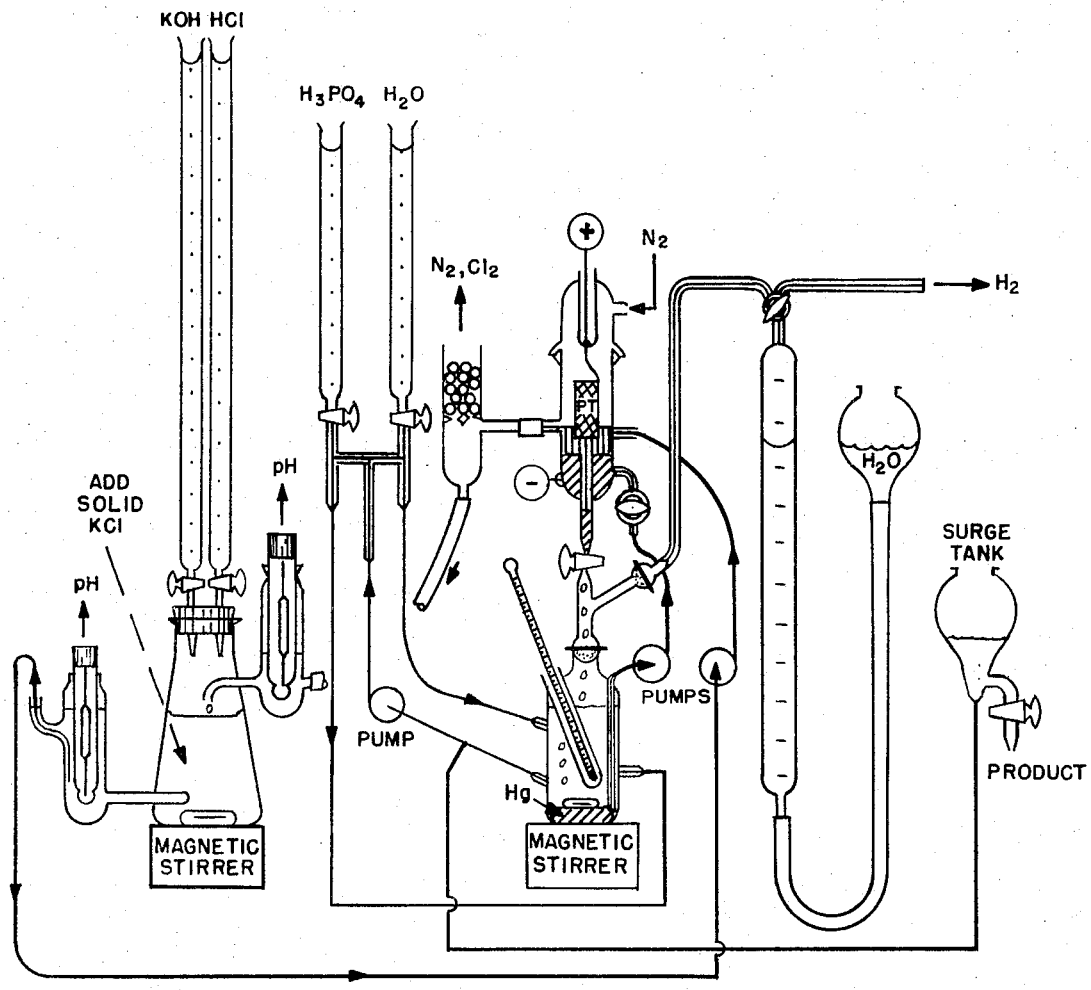
Figure 4:
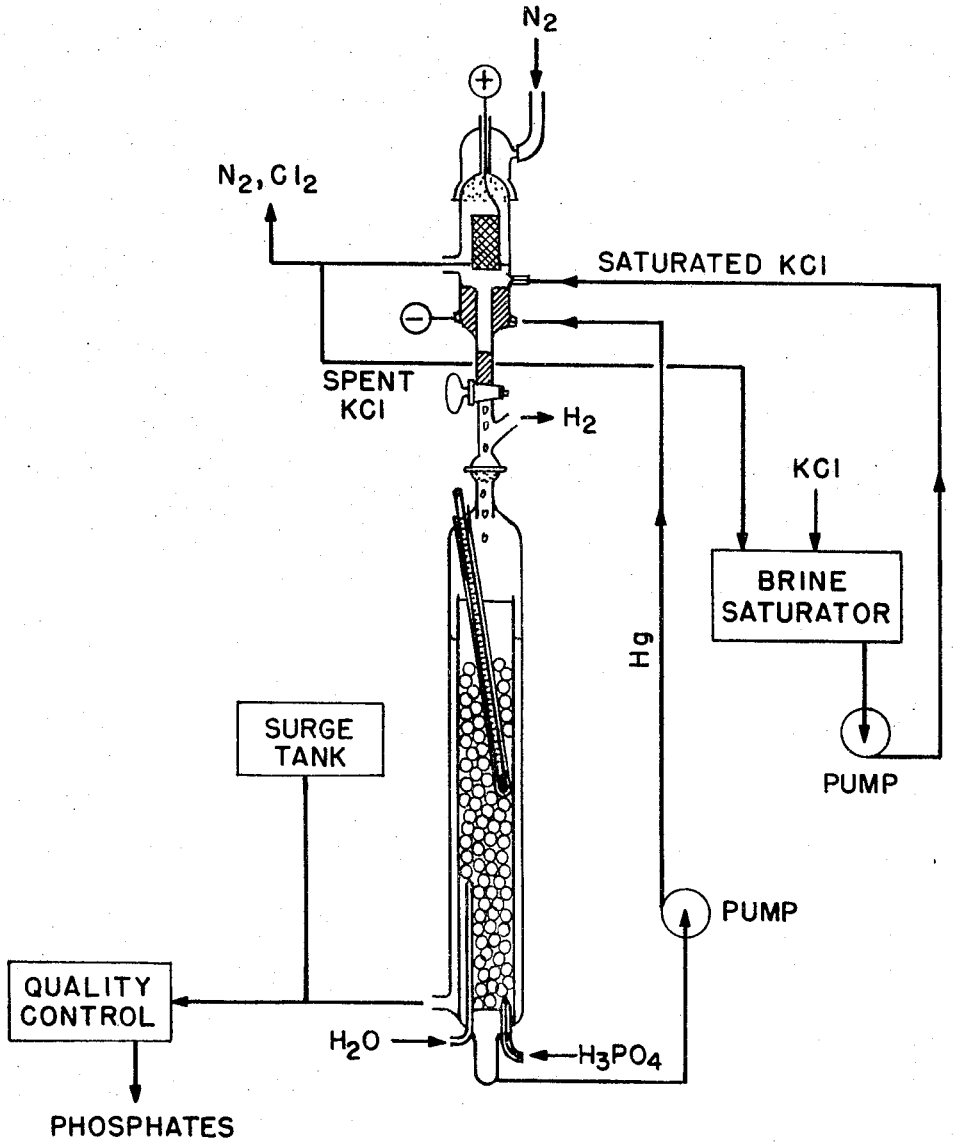
Figure 5:
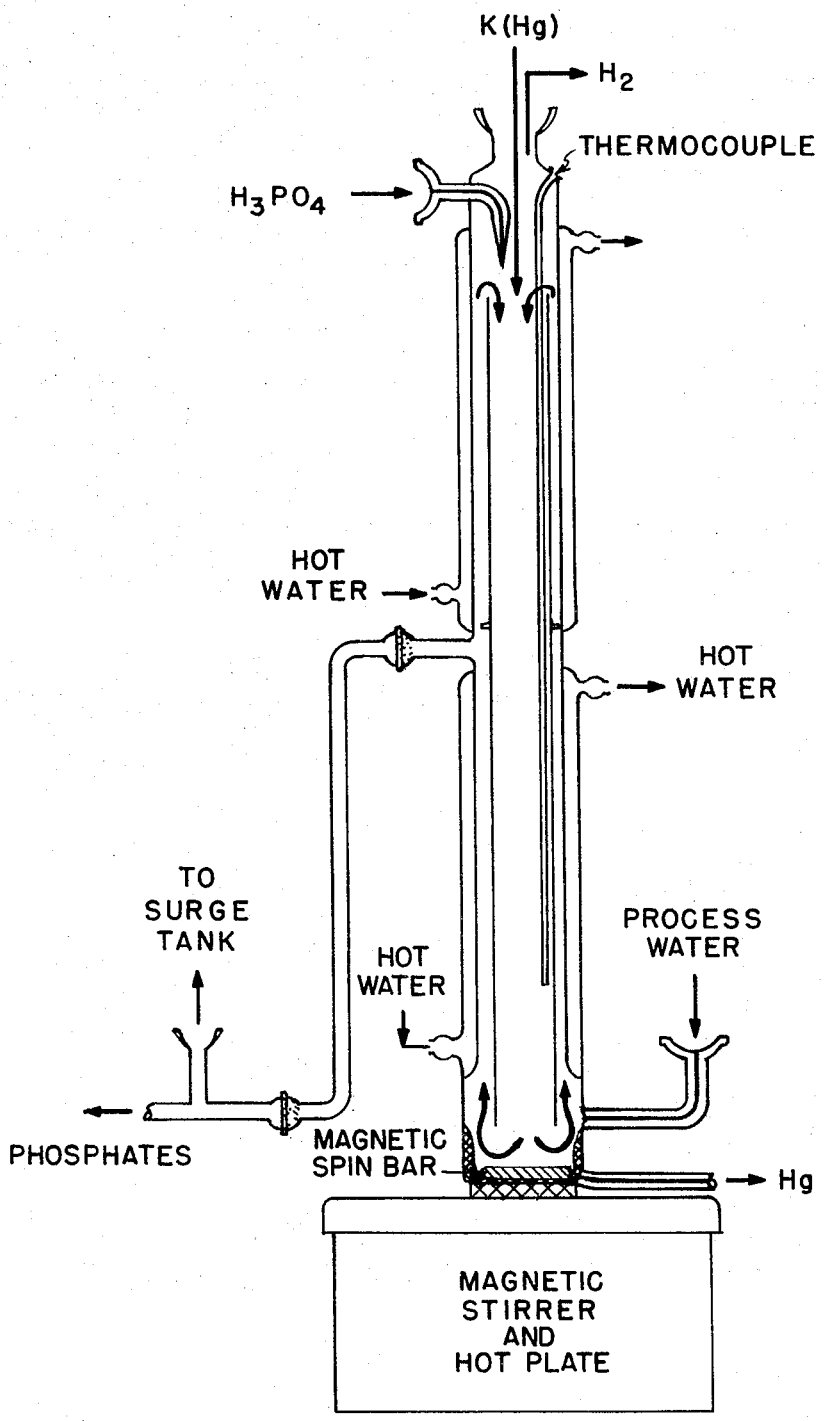

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 399

T914,007

PRODUCTION OF CHLORIDE-FREE POTASSIUM PHOSPHATES

Travis P. Hignett, 704 Wilson Dam Circle, Sheffield, Ala. 35660, and Anthony J. Smith, 710 Prospect St., Florence, Ala. 35630

Filed Oct. 10, 1972, Ser. No. 296,296

Int. Cl. C05b *7/00*

U.S. Cl. 71—34

5 Sheets Drawing. 17 Pages Specification

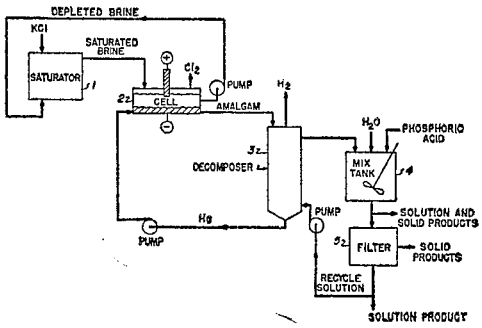

A process for the production of chlorine, hydrogen, and high analysis chloride-free potassium orthophosphate and potassium polyphosphate fertilizers. Saturated potassium chloride brine and mercury are pumped into a mercury cell where the brine is electrolyzed to produce chlorine at the anode and potassium amalgam at the mercury cathode. Water and either orthophosphoric or polyphosphoric acid solution are fed to the decomposer unit where the amalgam is subsequently stripped of potassium in the production of hydrogen gas and potassium phosphate solution, solids, or solution with solids. Decomposition is effected with or without short-circuiting elements in the decomposer. The spent brine is resaturated with solid potassium chloride. The resaturated brine and the mercury recovered from the decomposed amalgam are recycled to the electrolysis cell. Stable potassium polyphosphate solutions as concentrated as 70 percent in plant food $$(P_2O_5\% + K_2O\%)$$

are proposed; a concentration of 62 percent plant food was attained in a stable potassium polyphosphate solution with a pH of 7.67 and a density of 1.740 g./ml. at 25° C.

PRODUCTION OF CHLORIDE-FREE POTASSIUM PHOSPHATES

Filed Oct. 10, 1972 5 Sheets-Sheet 1

PRODUCTION OF CHLORIDE-FREE POTASSIUM PHOSPHATES

Filed Oct. 10, 1972 5 Sheets-Sheet 2

PRODUCTION OF CHLORIDE-FREE POTASSIUM PHOSPHATES

Filed Oct. 10, 1972 5 Sheets-Sheet 3

PRODUCTION OF CHLORIDE-FREE POTASSIUM PHOSPHATES

Filed Oct. 10, 1972 5 Sheets-Sheet 4